United States Patent
Amikura et al.

(10) Patent No.: US 8,597,401 B2
(45) Date of Patent: Dec. 3, 2013

(54) EXHAUSTING METHOD AND GAS PROCESSING APPARATUS

(75) Inventors: Norihiko Amikura, Nirasaki (JP); Risako Miyoshi, Nirasaki (JP)

(73) Assignee: Tokyo Electron Limited (JP)

( * ) Notice: Subject to any disclaimer, the term of this patent is extended or adjusted under 35 U.S.C. 154(b) by 36 days.

(21) Appl. No.: 13/205,077

(22) Filed: Aug. 8, 2011

(65) Prior Publication Data

US 2012/0031266 A1 Feb. 9, 2012

Related U.S. Application Data

(60) Provisional application No. 61/375,540, filed on Aug. 20, 2010.

(30) Foreign Application Priority Data

Aug. 9, 2010 (JP) ................................ 2010-178688

(51) Int. Cl.
*H01L 21/00* (2006.01)

(52) U.S. Cl.
USPC .............. 95/22; 55/385.1; 438/759; 438/905; 438/909; 700/273; 700/274; 700/282

(58) Field of Classification Search
USPC ........... 55/385.1; 95/22; 118/712; 427/248.1, 427/299; 438/3, 4, 509, 694, 725, 778, 503, 438/507, 935, 905, 909; 700/55, 210, 273, 700/282

See application file for complete search history.

(56) References Cited

U.S. PATENT DOCUMENTS

| | | | | |
|---|---|---|---|---|
| 6,025,252 | A * | 2/2000 | Shindo et al. ................. | 438/509 |
| 8,012,880 | B2 * | 9/2011 | Chiba ........................... | 438/725 |
| 8,048,687 | B2 * | 11/2011 | Shimizu et al. ................ | 438/4 |
| 2009/0286399 | A1 * | 11/2009 | Fujii et al. ..................... | 438/694 |
| 2010/0050867 | A1 * | 3/2010 | Murata ............................ | 95/22 |
| 2010/0062612 | A1 * | 3/2010 | Ishikawa ....................... | 438/778 |
| 2010/0330283 | A1 * | 12/2010 | Nakamori et al. ............. | 427/299 |
| 2011/0294232 | A1 * | 12/2011 | Asako et al. ..................... | 438/4 |
| 2012/0187083 | A1 * | 7/2012 | Hashizume ..................... | 216/37 |
| 2012/0244641 | A1 * | 9/2012 | Tomioka .......................... | 438/3 |
| 2012/0251721 | A1 * | 10/2012 | Matsumoto et al. ........ | 427/248.1 |

FOREIGN PATENT DOCUMENTS

JP 2006-049798 2/2006

* cited by examiner

*Primary Examiner* — Duane Smith
*Assistant Examiner* — Minh-Chau Pham
(74) *Attorney, Agent, or Firm* — Cantor Colburn LLP

(57) ABSTRACT

An exhausting method includes determining an exhaust flow rate of a process gas to be a predetermined value that is less than or equal to a gas flow rate corresponding to a maximum process capability of a purification system when the process gas is diluted to a lower explosive limit; calculating a pressure drop amount per unit time to maintain the determined exhaust flow rate of the process gas, based on a relation between the exhaust flow rate and the pressure drop amount per unit time; and evacuating an inside of the chamber to maintain the determined exhaust flow rate, while controlling the pressure through an automatic pressure control valve by setting a target pressure value to be updated as a control value of the automatic pressure control valve at every predetermined time interval so as to achieve a calculated pressure drop amount per unit time.

9 Claims, 6 Drawing Sheets

EXHAUSTING METHOD AND GAS PROCESSING APPARATUS

CROSS-REFERENCE TO RELATED PATENT APPLICATIONS

This application claims the benefits of Japanese Patent Application No. 2010-178688, filed on Aug. 9, 2010 in the Japan Patent Office, and U.S. patent application No. 61/375,540, filed on Aug. 20, 2010 in the U.S. Patent and Trademark Office, the disclosures of which are incorporated herein in its entirety by reference.

BACKGROUND OF THE INVENTION

1. Field of the Invention

The present invention relates to an exhausting method and a gas processing apparatus for introducing a flammable process gas into a chamber, performing a complete enclosure process, exhausting the process gas inside the chamber, and diluting the exhausted flammable gas for making the exhausted flammable gas purify.

2. Description of the Related Art

In manufacturing semiconductor devices, a semiconductor wafer is held in a chamber, and a flammable process gas is introduced into the chamber to a predetermined pressure in a state where an exhaust line is closed, and then a complete enclosure process is performed under the predetermined pressure.

For example, it has recently been suggested that a recovery process be performed by using a flammable silylating agent such as N-Trimethylsilyldimethylamine (hereinafter, referred to as TMSDMA) or the like in order to recover from damage applied to a low dielectric constant (hereinafter, referred to as low-K) film having a low parasitic capacitance during an etching process or a process removing a resist film (ashing) when the low-K film is used as an interlayer insulation film (Patent Reference 1). The recovery process is performed as the complete enclosure process described above.

After performing the complete enclosure process using the flammable gas, when the flammable gas inside the chamber is exhausted, as a safety policy, the exhausted flammable gas needs to be diluted to a lower explosive limit and additionally be purified by using a purification system.

However, if an exhaust valve is opened simply to a predetermined opening degree, a large amount of gas is exhausted in an initial stage. Thus, in a case of the flammable gas having a low level of the lower explosive limit, an enormous amount of diluting gas is necessary, and thus a process capability of the purification system is exceeded. In addition, a suitable amount of the diluting gas has to be supplied for the large amount of exhaust in the initial stage, and thus a large amount of the diluting gas is used wastefully. If the exhaust amount in the initial stage is set to be low to address the above problem, a throughput is degraded.

3. Prior Art Reference (Patent Reference 1) Japanese Patent Laid-open Publication No. 2006-049798

SUMMARY OF THE INVENTION

To solve the above and/or other problems, the present invention provides an exhausting method and a gas processing apparatus capable of exhausting a flammable gas safely while preventing a diluting gas from being wasted without degrading a throughput.

According to an aspect of the present invention, an exhausting method of introducing a flammable process gas into a chamber to perform a complete enclosure process at a predetermined process pressure, evacuating an inside of the chamber, diluting the flammable process gas exhausted from the chamber with a diluting gas, and making the process gas purify by using a purification system, the exhausting method includes: determining an exhaust flow rate of the process gas to be a predetermined value that is less than or equal to a gas flow rate corresponding to a maximum process capability of the purification system when the process gas is diluted to a lower explosive limit; calculating a pressure drop amount per unit time in the chamber to maintain the determined exhaust flow rate of the process gas, based on a relation between the exhaust flow rate and the pressure drop amount per unit time in the chamber; and evacuating the inside of the chamber to maintain the determined exhaust flow rate until the pressure inside the chamber is to be from the predetermined process pressure to a complete suction state in the chamber, while controlling the pressure inside the chamber through an automatic pressure control valve by setting a target pressure value in the chamber to be updated as a control value of the automatic pressure control valve at every predetermined time interval so as to achieve the calculated pressure drop amount per unit time in the chamber.

According to another aspect of the present invention, a gas processing apparatus includes: a chamber in which a flammable process gas is introduced to perform a complete enclosure process at a predetermined process pressure; a gas supply mechanism which supplies the process gas into the chamber; an exhaust pipe connected to the chamber to exhaust the process gas inside the chamber; an automatic pressure control valve provided in the exhaust pipe; a manometer which measures a pressure inside the chamber; a diluting unit which supplies a diluting gas to the process gas exhausted from the chamber through the exhaust pipe to dilute the process gas; a purification system which makes the diluted process gas purify; and a control unit which controls an exhaust from the chamber, wherein the control unit determines an exhaust flow rate of the process gas to be a predetermined value that is less than or equal to a gas flow rate corresponding to a maximum process capability of the purification system when the process gas is diluted to a lower explosive limit; calculates a pressure drop amount per unit time in the chamber to maintain the determined exhaust flow rate of the process gas, based on a relation between the exhaust flow rate and the pressure drop amount per unit time in the chamber; and evacuates an inside of the chamber to maintain the determined exhaust flow rate until the pressure inside the chamber is to be from the process pressure to a complete suction state in the chamber, while controlling the pressure inside the chamber through an automatic pressure control valve by setting a target pressure value in the chamber to be updated as a control value of the automatic pressure control valve at every predetermined time interval so as to achieve the calculated pressure drop amount per unit time in the chamber.

According to another aspect of the present invention, a non-transitory computer-readable medium stores a program that operates in a computer and controls a gas processing apparatus, wherein the program controls the gas processing apparatus to execute the above described exhausting method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described with reference to accompanying drawings.

Figure 1:
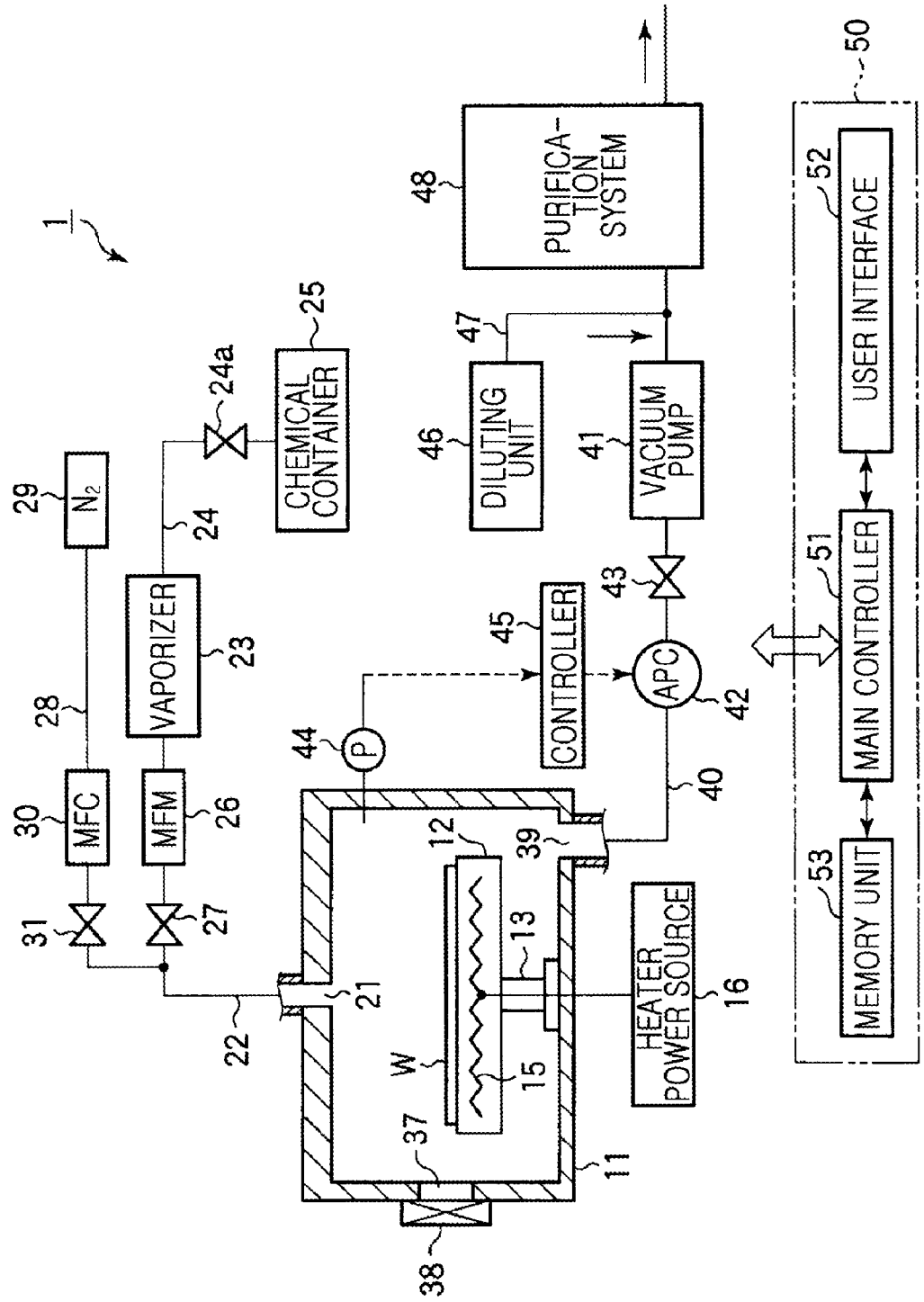
FIG. 1 is a schematic diagram of a gas processing apparatus for executing an exhausting method according to an embodiment of the present invention.

FIG. 1 is a schematic diagram of a gas processing apparatus for executing an exhausting method according to an embodiment of the present invention.

Here, the gas processing apparatus is configured as a processing apparatus which performs a recovery process to recover from damage of a low-K film; however, the present invention is not limited thereto.

The gas processing apparatus 1 includes a chamber 11 having a sealed structure for holding a wafer W that is a substrate to be processed, and a holding stage 12 is provided in the chamber 11 for horizontally supporting the wafer W, that is, the substrate to be processed. The holding stage 12 is supported by a supporting member 13 that is a cylinder extending upward from a center of a bottom portion of the chamber 11. In addition, a heater 15 of a resistive heating type is embedded in the holding stage 12, and the heater 15 heats the holding stage 12 when it is fed with electric power from a heater power source 16, and also heats the water W mounted on the holding stage 12 by the heat. In addition, a thermocouple (not shown) is inserted into the holding stage 12 so as to be able to control a temperature of the wafer W to be at a predetermined temperature level. Three wafer supporting pins (not shown) for supporting and elevating the wafer W are provided on a surface of the holding stage 12 to protrude up/down from the surface of the holding stage 12.

A gas inlet 21 is provided in a center portion of a ceiling wall of the chamber 11, and a process gas supply pipe 22 is connected to the gas inlet 21. A vaporizer 23 is connected to the process gas supply pipe 22, and a chemical container 25 is connected to the vaporizer 23 via a pipe 24. A chemical having a methyl group (—$CH_3$) for performing the recovery process, for example, TMSDMA, which is a silylating agent, is fed from the chemical container 25 to the vaporizer 23 via the pipe 24. A valve 24a is provided on the pipe 24. The chemical, vaporized in the vaporizer 23, is supplied as the process gas into the chamber 11 via the process gas supply pipe 22 and the gas inlet 21. A flow measurer 26 such as a mass flow meter, and a valve 27 are provided on the process gas supply pipe 22. An $N_2$ gas supply pipe 28 for supplying an $N_2$ gas as an inert gas is connected to the process gas supply pipe 22, and an $N_2$ gas supply source 29 supplies the $N_2$ gas to the $N_2$ gas supply pipe 28. In addition, the $N_2$ gas as a purge gas or a diluting gas is supplied from the $N_2$ gas supply source 29 into the chamber 11 via the $N_2$ gas supply pipe 28, the process gas supply pipe 22, and the gas inlet 21. A flow controller 30 such as a mass flow controller, and a valve 31 are provided on the $N_2$ gas supply pipe 28. Also, another inert gas may be used instead of the $N_2$ gas.

A wafer transfer from/to hole 37 is provided in a side wall of the chamber 11, and the wafer transfer from/to hole 37 is opened/closed by a gate valve 38. In addition, the wafer W is transferred from/to the chamber 11 in a state where the gate valve 38 is opened.

An exhaust port 39 is provided in a peripheral portion on the bottom portion of the chamber 11, and an exhaust pipe 40 is connected to the exhaust port 39. A vacuum pump 41 is provided on the exhaust pipe 40. An automatic pressure control (hereinafter, referred to as APC) valve 42 and an opening/closing valve 43 are provided on an upstream side of the vacuum pump 41 on the exhaust pipe 40. On the other hand, a capacitance manometer 44 is provided in the chamber 11 as a pressure sensor for measuring a pressure inside the chamber 11. In addition, a controller 45 for controlling the APC valve 42 based on the pressure measured by the capacitance manometer 44 is also provided. That is, based on the pressure value measured by the capacitance manometer 44, an exhaust inside the chamber 11 is performed by the vacuum pump 41 while the controller 45 controls an opening degree of the APC valve 42 to maintain the pressure inside the chamber 11 at a constant level, and thus the pressure inside the chamber 11 may be controlled to be at a predetermined pressure. According to the present embodiment, when the pressure inside the chamber 11 reaches a predetermined value during the process, the process gas is enclosed by the opening/closing valve 43 and a predetermined process is performed according to a complete enclosure process. In addition, a depressurization step is performed by using the APC valve 42 when the exhaust is performed after the process, which will be described later.

A diluting unit 46 for supplying a diluting gas (for example, an $N_2$ gas) to the exhaust pipe 40 via a pipe 47 is connected to a downstream side of the vacuum pump 41 on the exhaust pipe 40, and additionally, a purification system 48 for performing a harm removing process of the gas is connected to the downstream side of the vacuum pump 41.

The gas processing apparatus 1 further includes a control unit 50. The control unit 50 controls each of components in the gas processing apparatus 1, and includes a main controller 51 having a micro processor (computer) that actually controls each of the components. A user interface 52 including a keyboard that receives an input operation of a command or the like for an operator to control the gas processing apparatus 1, a display that visibly displays an operating state of the gas processing apparatus 1, or the like is connected to the main controller 51. In addition, a memory unit 53 which stores a control program for controlling a control target in each component of the gas processing apparatus 1 or a program for making the gas processing apparatus 1 perform a predetermined process, that is, a process recipe, is connected to the main controller 51. The process recipe is stored in a non-transitory computer-readable medium of the memory unit 53. The non-transitory computer-readable medium may be a stationary type such as a hard disk, or a portable type such as a CD-ROM, a DVD, a flash memory, or the like. Also, a recipe may be appropriately transferred from another device via, for example, an exclusive line. In addition, if necessary, a certain process recipe is called out of the memory unit 53 by a command or the like from the user interface 52, and executed in the main controller 51, and thus a predetermined process is performed under the control of the main controller 51. In particular, the main controller 51 transmits a command to the controller 45 to control an exhaust by using the APC valve 42 based on a pressure/hour to evacuate an inside of the chamber 11 including a flammable gas at a predetermined flow rate, as will be described later.

Next, operations of the gas process and an exhaust process of the inside of the chamber performed after the gas process in the gas processing apparatus 1 having the above structure will be described as follows.

Here, the recovery process, that is, the gas process, using the process gas obtained by vaporizing the chemical having the methyl group (—$CH_3$), for example, TMSDMA, which is a silylating agent, is performed on a damaged layer formed on a surface of a low-K film when performing an etching or ashing process for providing a wiring recess or a connection hole by a dual-damascene method or the like.

Figure 2:
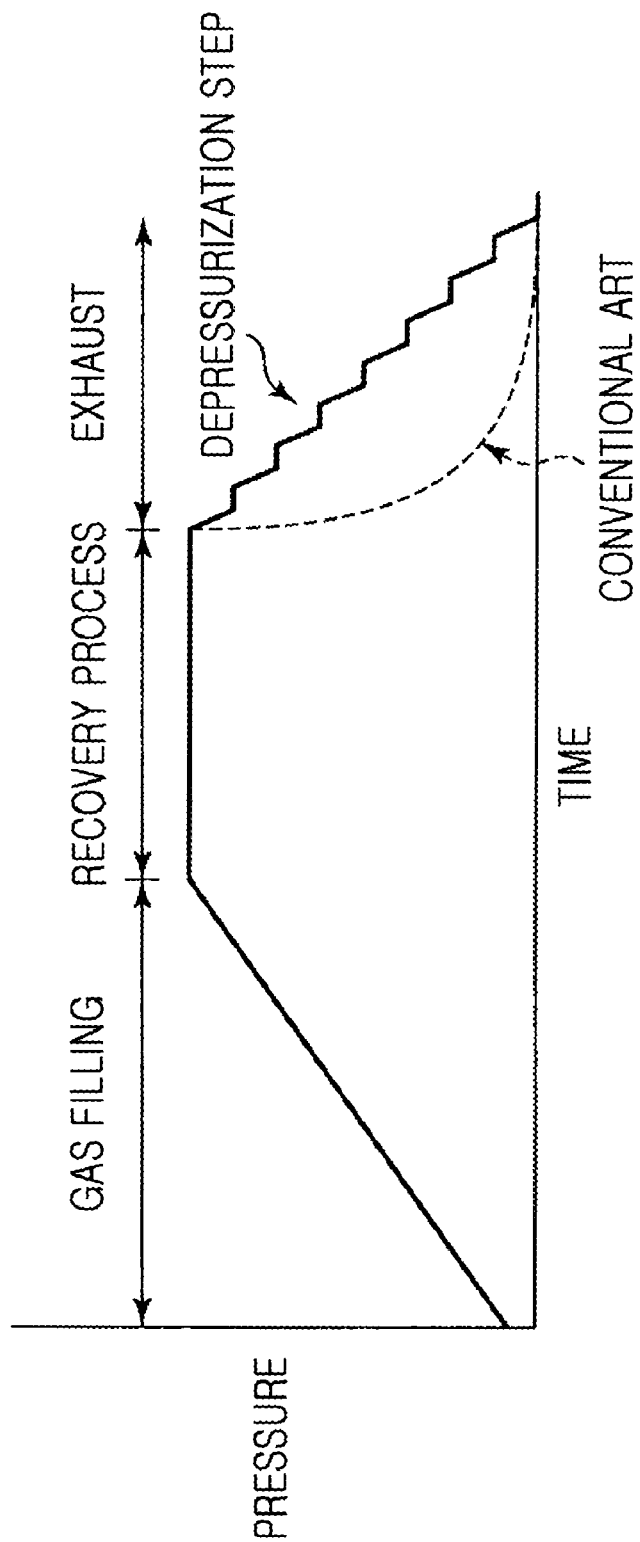
FIG. 2 is a schematic diagram illustrating a relation between a processing time and a pressure inside a chamber when a process gas is filled into the chamber, when a recovery process as a process gas is performed, and when an exhaust inside the chamber is performed.

FIG. 2 is a schematic diagram showing a relation between a process time and a pressure inside the chamber when the process gas is filled into the chamber, when the recovery process is performed as the gas process, and when an exhaust inside the chamber is performed.

First, the gate valve 38 is opened, and the wafer W having a low-K film on which etching damage or ashing damage has occurred is transferred into the chamber 11 via the wafer transfer from/to hole 37, and the wafer W is held on the holding stage 12 heated to a predetermined temperature by the heater 15. In addition, the inside of the chamber 11 is evacuated by the vacuum pump 41 to be a predetermined depressurized atmosphere, and after that, the chemical having the methyl group (—$CH_3$), for example, TMSDMA, which is the silylating agent, for performing the recovery process is supplied from the chemical container 25 to the vaporizer 23 via the pipe 24 by pressure-feeding, for example. Then, the process gas, vaporized in the vaporizer 23, is supplied into the chamber 11 via the process gas supply pipe 22 and the gas inlet 21. Here, a diluting gas (an $N_2$ gas) may be supplied together with the process gas. Accordingly, the pressure inside the chamber increases slowly. A supply of the process gas is continued until the pressure inside the chamber reaches a process pressure (for example, 10 to 750 Torr and preferably 10 to 50 Torr (6650 Pa)). At this time, a flow rate of the process gas is, for example, 500 to 700 mL/min (sccm).

At a time point when the pressure inside the chamber 11 reaches the process pressure, the supply of the process gas is stopped, the opening/closing valve 43 is closed to enclose the process gas in the chamber 11 to maintain the pressure inside the chamber 11 at the process pressure, and then the recovery process of the low-K film is performed according to the complete enclosure process.

In performing the recovery process, the process gas having the methyl group is supplied to the low-K film having a damage layer on a layer due to etching and ashing, and thus an OH group of the damage layer is replaced with the methyl group or a group including the methyl group. Accordingly, a relative dielectric constant (k value) increased due to the damage is lowered.

After performing the recovery process for a predetermined time, the inside of the chamber 11 is evacuated by using the vacuum pump 41 while the opening/closing valve 43 is opened.

Here, conventionally, a valve body of the APC valve 42 is opened to a predetermined opening degree to perform the exhaust operation; however, the process gas is exhausted at a large flow rate because the pressure inside the chamber 11 is high, and accordingly, the pressure inside the chamber 11 is sharply decreased as represented by a dotted line of FIG. 2. The chemical having the methyl group (—$CH_3$) such as the silylating agent or the like used in the recovery process has a low lower explosive limit, and in particular, if TMSDMA is used, the lower explosive limit is 0.8%. Thus, if the process gas is exhausted at a large flow rate in an initial stage, an enormous amount of diluting gas needs to be supplied from the diluting unit 46, and thus a process capability of the purification system 48 may be exceeded. In addition, since the diluting gas is continuously supplied according to an exhaust amount of the large flow rate in the initial stage, the diluting gas is massively and wastefully consumed. To avoid this, if the initial exhaust amount is set to be small by reducing the opening degree of the APC valve 42, a throughput is degraded.

Therefore, according to the present embodiment, in order to make the exhaust amount of the process gas be almost constant at an amount that may be processable by the purification system 48 when the process gas is diluted to the lower explosive limit by the diluting gas, the depressurization step for making a pressure drop amount per unit time in the chamber be constant is performed by controlling the APC valve 42. That is, after performing the process, as denoted by a solid line of FIG. 2, an operation of dropping the pressure constantly over a predetermined time by setting a control amount of the APC valve 42 to be updated at every predetermined time interval is repeatedly performed from the level of the process pressure to a complete suction state of the chamber.

Hereinafter, the above process will be described in more detail as follows.

Figure 3:
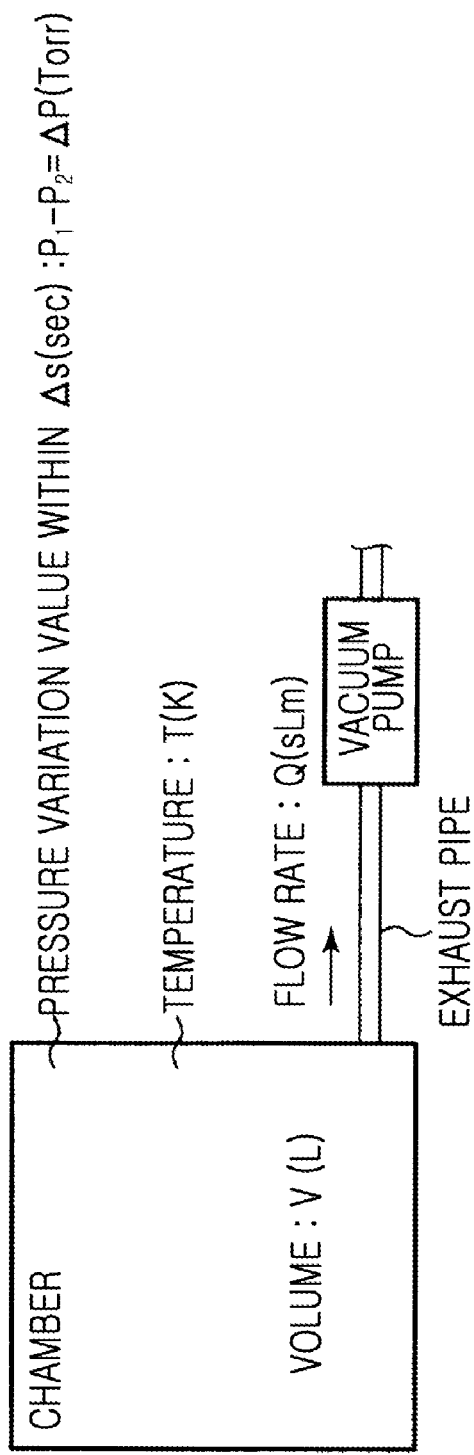
FIG. 3 is a schematic diagram illustrating meaning of symbols in an equation for describing a principle of a depressurization step.

As shown in FIG. 3, if it is assumed that a volume of the chamber is V(L), a temperature inside the chamber is T(K), a pressure variation value per unit time $\Delta s(sec)$ in the chamber is $P_1-P_2=\Delta P$ (Torr), and an exhaust flow rate is Q(sLm), an amount of the process gas (number of moles) exhausted during the unit time $\Delta s$ is calculated by using the equation of state for an ideal gas: PV=nRT.

First, note the pressure variation inside the chamber; an amount $n_1$ exhausted during the unit time $\Delta s$ is represented by the following equation (1).

$$n_1=(P_1V/RT_1)-(P_2V/RT_2) \quad (1)$$

Here, because of $T_1 \approx T_2$, equation (1) becomes following equation (2).

$$n_1=V(P_1-P_2)/RT_1=V \cdot \Delta P/RT_1 \quad (2)$$

Next, note the exhaust flow rate Q(sLm); since sLm is defined as a volume L flowing for one minute under a pressure of 760 Torr and a temperature of 273 K, an amount $n_2$ exhausted during the unit time $\Delta s$ is represented by the following equation (3).

$$n_2=(Q \times (\Delta s/60) \times 760)/(R \times 273) \quad (3)$$

Since $n_1$ is equal to $n_2$, the following equation (4) is obtained.

$$V(P_1-P_2)/RT_1=V \cdot \Delta P/RT_1=(Q \times (\Delta s/60) \times 760)/(R \times 273) \quad (4)$$

Summing up the above equation (4), the following equation (5) is obtained.

$$Q=(V \cdot \Delta P/T_1) \times (60/\Delta s) \times (273/760) \quad (5)$$

Here, since V, $T_1$, and $\Delta s$ are constants, Q and $\Delta P$ are in proportion to each other, and thus the pressure variation value $\Delta P$ per unit time needs to be set constant to make the value of Q be constant.

Figure 4:
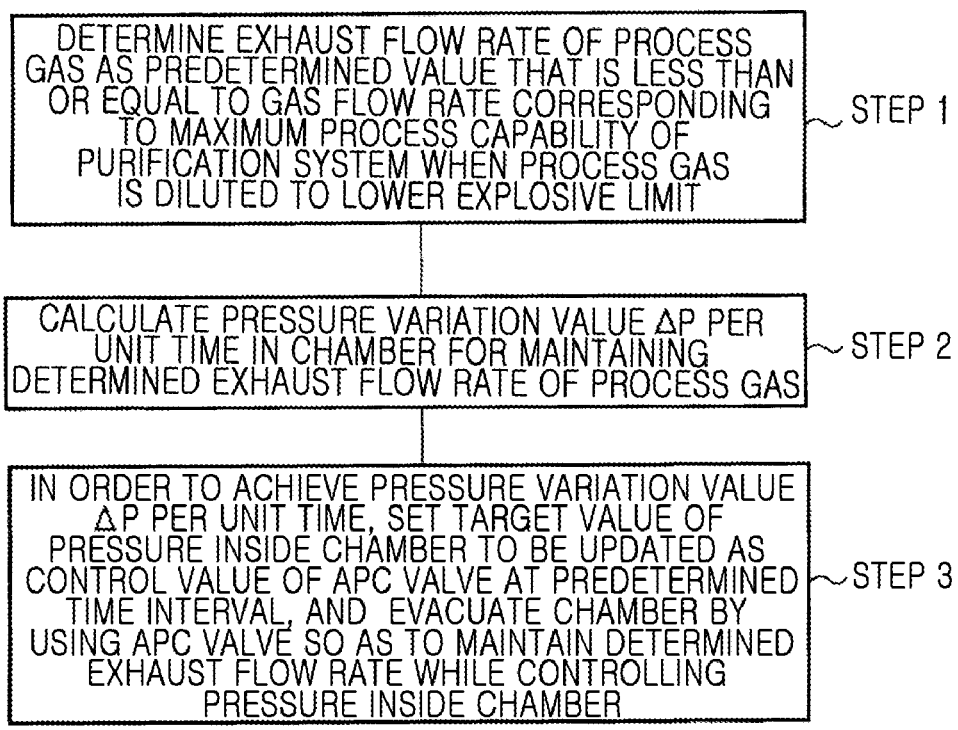
FIG. 4 is a flowchart illustrating a flow of processes in the depressurization step.

From the description above, a flow of the depressurization steps is illustrated in a flowchart of FIG. 4.

First, the exhaust flow rate of the process gas is determined as a predetermined value that is less than or equal to a gas flow rate corresponding to the maximum process capability of the purification system 48 when the process gas is diluted to the lower explosive limit (STEP 1). Next, the pressure variation value ΔP per unit time in the chamber for maintaining the determined exhaust flow rate Q of the process gas is calculated by using the equation (5) above (STEP 2). Thereafter, in order to achieve the pressure variation value ΔP per unit time, a target value of the pressure inside the chamber is set to be updated as a control value of the APC valve 42 at every predetermined time interval so that the inside of the chamber is evacuated so as to maintain the determined exhaust flow rate until the pressure inside the chamber 11 is to be from the process pressure to a minimum pressure (complete suction state of the chamber) while controlling the pressure inside the chamber 11 by using the APC valve 42 (STEP 3).

For example, when TMSDMA is used as the process gas, the lower explosive limit is 0.8%, and thus if the maximum process capability of the purification system 48 is 100 L/min, the exhaust flow rate of TMSDMA is at maximum 0.8 L/min (sLm). Therefore, the exhaust flow rate is set to a predetermined value that is less than or equal to 0.8 L/min (sLm) and maintained constant during exhaust. In this exhaustion system, in order to evacuate the inside of the chamber 11 at the fastest speed, the exhaust flow rate is maintained at 0.8 L/min (sLm). Here, since the volume V of the chamber is a well known value, the pressure variation value ΔP is calculated as 0.6 Torr per second based on the equation (5) above in order to maintain the exhaust flow rate constant at 0.8 L/min (sLm). Here, a response speed of the APC valve 42 is considered in order to evacuate while freely varying the pressure within a possible range. For example, if a limitation of the response speed of the APC valve 42 is 0.5 sec, the main controller 51 may control the controller 45 of the APC valve 42 such that the target value of the chamber pressure is to be updated as the control value of the APC value 42 at every 0.5 sec, and thus the pressure is dropped by 0.3 Torr at every 0.5 sec in order to obtain the pressure variation value. Here, the exhaust flow rate may be controlled to be slightly lower than the maximum exhaust flow rate, that is, 0.8 L/min (sLm), for example, to be about 0.7 L/min.

As described above, according to the present embodiment, when the flammable process gas is exhausted from the chamber after performing the complete enclosure process, in order to exhaust the process gas while maintaining the exhaust flow rate less than or equal to the maximum process capability of the purification system even if the process gas is diluted to the lower explosive limit or less, the control value of the APC valve 42 is updated such that the pressure drop amount per unit time is constant while the pressure is to be from the process pressure to the minimum pressure. Therefore, the flammable process gas may be safely exhausted without wasting the diluting gas. Moreover, the exhaust flow rate of the process gas is set as a value that is close to the maximum process capability of the purification system when the process gas is diluted to the lower explosive limit (for example, about 90 to 100% of the maximum process capability), and thus the throughput may be maintained high.

In addition, in the depressurization steps, the pressure drop amount per unit time is controlled by the APC valve 42 based on only the pressure inside the chamber 11 as the measurement information for controlling the pressure, and thus a control may be simply performed. In addition, since the pressure drop amount in the chamber 11 is converted into the exhaust flow rate, the control may be performed regardless of the kind of the process gas.

Next, in the above-described depressurization steps, a control operation in a state where a protective valve is closed due to a response of a pressure switch (PSW) of the capacitance manometer will be described as follows.

The capacitance manometer 44 used as the pressure sensor includes a protective valve so as not to generate a zero difference, and thus the protective valve is closed when the PSW responds to excess of a predetermined pressure. For example, if the capacitance manometer 44 having a maximum pressure of 100 Torr is used, the protective valve is closed when the PSW responds to excess of 100 Torr, and thus the pressure measurement using the capacitance manometer 44 is impossible. Therefore, if the protective valve of the capacitance manometer 44 is closed when the process gas is introduced into the chamber 11, a sequence of performing a vacuum suction is performed by adjusting the valve body of the APC valve 42 at a predetermined angle automatically after stopping the supply of the process gas, and a sequence of performing the above-described depressurization steps is performed after the pressure is lowered and the protective valve is opened. At this time, the angle of the valve body of the APC valve 42 is adjusted such that the process gas is exhausted at a flow rate that is less than the exhaust flow rate during the depressurization steps. If a sequence of stopping the apparatus after the protective valve is closed due to the response of the PSW is set, it may not be recognized whether the protective valve is closed, opened or the like by introducing the process gas, and thus a sequence of performing the vacuum suction automatically for safety is set.

On the other hand, if the protective valve is closed due to factors other than the introducing of the process gas, for example, if the protective valve is closed due to introducing of a purge gas or opening to atmosphere, there is no possibility of explosion. Therefore, the depressurization steps are not performed, and the vacuum suction is performed once in order to evacuate rapidly.

Next, results of comparing the conventional exhausting method with the exhaust control using the depressurization steps according to the present embodiment will be described as follows.

Figure 5:
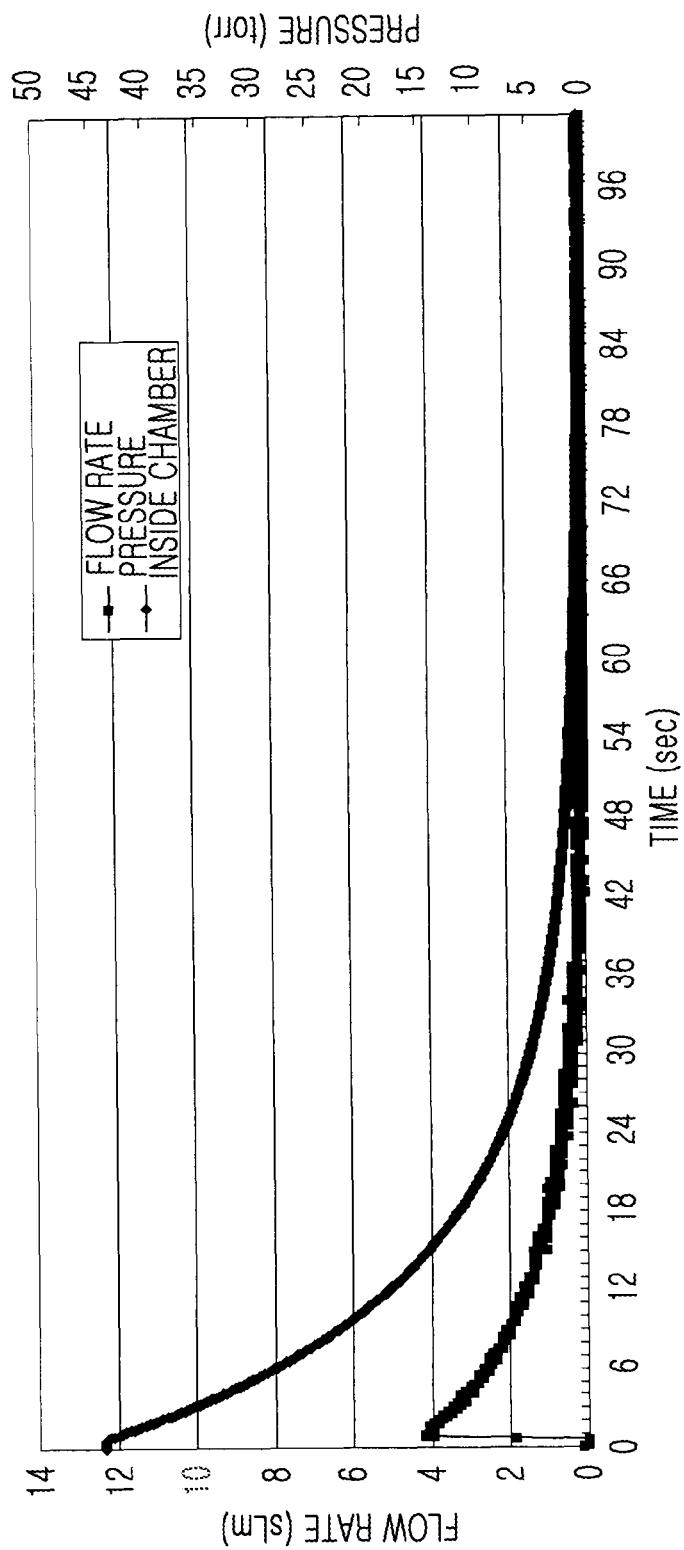
FIG. 5 is a diagram illustrating variations of a pressure inside the chamber and an exhaust flow rate according to time in a case where an exhaust is performed by adjusting a valve body of an automatic pressure control (hereinafter, referred to as an APC) valve at an angle of 15°.
Figure 6:
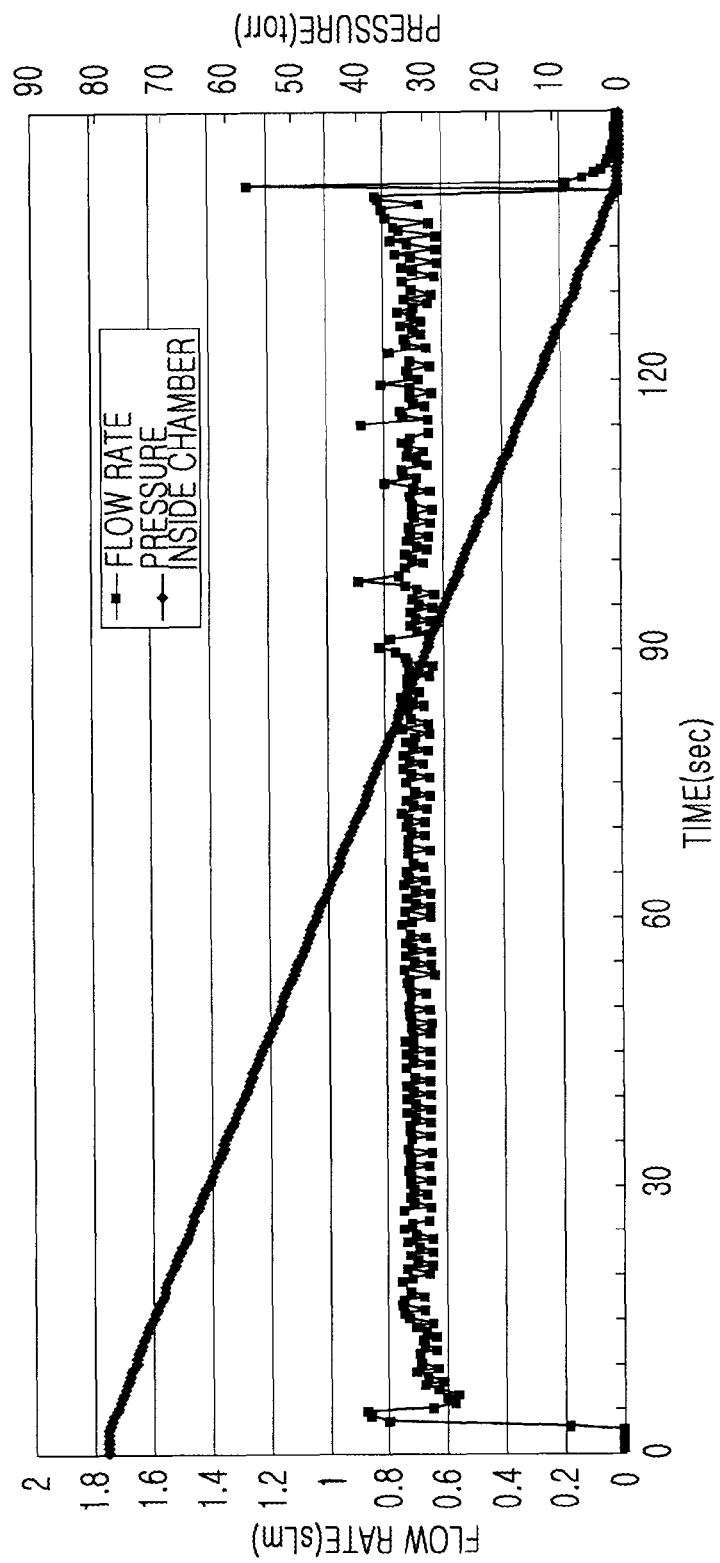
FIG. 6 is a diagram illustrating variations of the pressure inside the chamber and the exhaust flow rate according to time in a case where depressurization steps for controlling the APC valve are performed to drop the pressure by 0.3 Torr at every 0.5 sec.

FIG. 5 illustrates variations of the pressure inside the chamber and the exhaust flow rate according to time in a case where an enclosure pressure is 43 Torr and an exhaust is performed by adjusting the valve body of the APC valve 42 at an angle of 15°, and FIG. 6 illustrates variations of the pressure inside the chamber and the exhaust flow rate according to time in a case where the enclosure pressure is 80 Torr, and where the above depressurization steps for controlling the APC valve 42 are performed to drop the pressure by 0.3 Torr at every 0.5 sec. In addition, the volume V of the chamber is a well known value. Also, in FIG. 6, a temperature $T_1$ inside the chamber is 31° C., and Δs is 0.5 sec.

According to the conventional exhausting method illustrated in FIG. 5, the exhaust flow rate is very high, that is, 4 sLm, at a high pressure point of the initial exhaust stage, and after that, the exhaust flow rate decreases because the pressure inside the chamber is sharply reduced. On the other hand, when the depressurization steps are performed, the exhaust flow rate is maintained constant at nearly 0.7 sLm as illustrated in FIG. 6.

In addition, the present invention may be modified variously without being limited to the above embodiments. In the above embodiment, the recovery process is performed by using TMSDMA as the flammable process gas; however, the gas process is not limited to the recovery process and may be any gas process using the flammable gas. In addition, the flammable process gas is not limited to TMSDMA, and various gases may be used according to the kind of processes. In the recovery process, other silylating agents such as dimethylsilyldimethylamine (DMSDMA), 1,1,3,3-tetramethyldisilazane (TMDS), or the like may be used as the flammable process gas besides TSMDMA, and a chemical having a methyl group (—$CH_3$), for example, dipivaloyl methane (DPM) or the like, may be used besides the silylating agent.

In addition, in the above embodiment, the semiconductor wafer is used as the substrate to be processed; however, the present invention is not limited thereto, and other substrates, for example, a flat panel display (FPD) substrate or the like, may be used.

According to the present invention, when the flammable process gas is exhausted from the chamber after performing the complete enclosure process, in order to exhaust the process gas while maintaining the exhaust flow rate less than or equal to the maximum process capability of the purification system even if the process gas is diluted to the lower explosive limit or less, the control value of the APC valve is set to be updated such that the pressure dropping amount per unit time is constant from the process pressure to the minimum pressure. Therefore, the flammable process gas may be safely exhausted without wasting the diluting gas. Moreover, the exhaust flow rate of the process gas is set to be nearly close to a gas flow rate corresponding to the maximum process capability of the purification system when the process gas is diluted to the lower explosive limit, and thus the throughput may be highly maintained.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An exhausting method of exhausting a flammable process gas from the chamber, which dilutes the process gas with a diluting gas and makes the process gas purify by using a purification system, the exhausting method comprising:
  introducing the process gas into the chamber to perform a process to a substrate at a predetermined process pressure;
  after the performing of the process is finished, determining an exhaust flow rate of the process gas from the chamber to be a predetermined value that is less than or equal to a gas flow rate corresponding to a maximum process capability of the purification system when the process gas is diluted to a lower explosive limit;
  calculating a pressure drop amount per unit time in the chamber to maintain the determined exhaust flow rate of the process gas, based on a relation between the exhaust flow rate and the pressure drop amount per unit time in the chamber; and
  evacuating the inside of the chamber to maintain the determined exhaust flow rate until the pressure inside the chamber is to be from the predetermined process pressure to a complete suction state in the chamber, while controlling the pressure inside the chamber through an automatic pressure control valve by setting a target pressure value in the chamber to be updated as a control value of the automatic pressure control valve at every predetermined time interval so as to achieve the calculated pressure drop amount per unit time in the chamber.

2. The exhausting method of claim 1, wherein the exhaust flow rate of the process gas is set as a value that is close to the gas flow rate corresponding to the maximum process capability of the purification system when the process gas is diluted to the lower explosive limit.

3. The exhausting method of claim 2, wherein the pressure inside the chamber is measured by using a capacitance manometer.

4. The exhausting method of claim 3, wherein:
  when a protective valve of the capacitance manometer is closed by introducing the process gas into the chamber, a supply of process gas is stopped, and then a valve body of the automatic pressure control valve is set to an angle, at which the exhaust flow rate of the process gas is to be the predetermined value, to perform a vacuum suction; and
  after opening the protective valve due to decrease of the pressure in the chamber, the determining of the exhaust flow rate, the calculating of the pressure drop amount per unit time in the chamber, and the evacuating of the inside of the chamber to maintain the determined exhaust flow rate are performed.

5. A gas processing apparatus comprising:
  a chamber in which a flammable process gas is introduced to perform a process at a predetermined process pressure;
  a gas supply mechanism which supplies the process gas into the chamber;
  an exhaust pipe connected to the chamber to exhaust the process gas inside the chamber;
  an automatic pressure control valve provided in the exhaust pipe;
  a manometer which measures a pressure inside the chamber;
  a diluting unit which supplies a diluting gas to the process gas exhausted from the chamber through the exhaust pipe to dilute the process gas;
  a purification system which makes the diluted process gas purify; and
  a control unit which controls an exhaust from the chamber, wherein the control unit controls the gas processing apparatus to:
  introduce the process gas into the chamber to perform a process to a substrate at a predetermined process pressure;
  after the performing of the process is finished, determine an exhaust flow rate of the process gas from the chamber to be a predetermined value that is less than or equal to a gas flow rate corresponding to a maximum process capability of the purification system when the process gas is diluted to a lower explosive limit;
  calculate a pressure drop amount per unit time in the chamber to maintain the determined exhaust flow rate of the process gas, based on a relation between the exhaust flow rate and the pressure drop amount per unit time in the chamber; and
  evacuate an inside of the chamber to maintain the determined exhaust flow rate until the pressure inside the chamber is to be from the process pressure to a complete suction state in the chamber, while controlling the pressure inside the chamber through an automatic pressure control valve by setting a target pressure value in the chamber to be updated as a control value of the automatic pressure control valve at every predetermined time interval so as to achieve the calculated pressure drop amount per unit time in the chamber.

6. The gas processing apparatus of claim 5, wherein the control unit sets the exhaust flow rate of the process gas as a value that is close to the gas flow rate corresponding to the maximum process capability of the purification system when the process gas is diluted to the lower explosive limit.

7. The gas processing apparatus of claim 5, wherein the manometer is a capacitance manometer.

8. The gas processing apparatus of claim 7, wherein when a protective valve of the capacitance manometer is closed by introducing the process gas into the chamber, the control unit stops a supply of process gas, and then adjusts a valve body of the automatic pressure control valve automatically to an angle, at which the exhaust flow rate of the process gas is to be the predetermined value, to perform a vacuum suction; and after opening the protective valve due to decrease of the pressure, the control unit performs determining the exhaust flow rate, calculating the pressure drop amount per unit time in the chamber, and evacuating the inside of the chamber to maintain the determined exhaust flow rate.

9. A non-transitory computer-readable medium storing a program that operates in a computer and controls a gas processing apparatus, wherein the program controls the gas processing apparatus to execute an exhausting method which comprises:

introducing a flammable process gas into the chamber to perform a process to a substrate at a predetermined process pressure;

after the performing of the process is finished, determining an exhaust flow rate of the process gas from the chamber to be a predetermined value that is less than or equal to a gas flow rate corresponding to a maximum process capability of the purification system when the process gas is diluted to a lower explosive limit;

calculating a pressure drop amount per unit time in the chamber to maintain the determined exhaust flow rate of the process gas, based on a relation between the exhaust flow rate and the pressure drop amount per unit time in the chamber; and evacuating the inside of the chamber to maintain the determined exhaust flow rate until the pressure inside the chamber is to be from the predetermined process pressure to a complete suction state in the chamber, while controlling the pressure inside the chamber through an automatic pressure control valve by setting a target pressure value in the chamber to be updated as a control value of the automatic pressure control valve at every predetermined time interval so as to achieve the calculated pressure drop amount per unit time in the chamber.

* * * * *